United States Patent

[11] 3,579,111

[72] Inventors Paul R. Johannessen
Lexington;
Thorleif Knutrud, Sundbury, Mass.

[21] Appl. No. 872,318
[22] Filed Oct. 29, 1969
[45] Patented May 18, 1971
[73] Assignee Sylvania Electric Products Inc.

[54] RADIO FREQUENCY PULSE GENERATOR USING DC CHARGING
5 Claims, 3 Drawing Figs.

[52] U.S. Cl. .......... 325/141, 307/252, 325/105, 325/120, 328/65, 331/165, 325/121
[51] Int. Cl. .......... H04b 1/04
[50] Field of Search .......... 315/180; 320/1; 325/105, 108, 110, 120, 121, 141, 161, 164, 169; 307/20, 140, 252; 328/63, 65; 331/165, 166

[56] References Cited

UNITED STATES PATENTS 2,555,305 6/1951 Alty .......... 331/166

*Primary Examiner*—Robert L. Griffin
*Assistant Examiner*—Albert J. Mayer
*Attorneys*—Norman J. O'Malley, Elmer J. Nealon and Robert T. Orner

ABSTRACT: A radiofrequency generator employing a charging inductor connected to a source of direct current (DC) energy through a charging switch. The capacitor of a radiofrequency (RF) tank circuit cooperates with the charging inductor to achieve resonant charging of the RF tank circuit. A power switch is closed causing the charged tank circuit to oscillate at its natural resonant frequency through a series-connected load.

INVENTOR.
PAUL R. JOHANNESSEN
THORLEIF KNUTRUD
BY
Robert T. Orme,
ATTORNEY

INVENTOR.
PAUL R. JOHANNESSEN
THORLEIF KNUTRUD
BY Robert T. Omer
ATTORNEY

RADIO FREQUENCY PULSE GENERATOR USING DC CHARGING

BACKGROUND of THE INVENTION

This invention relates to high power RF generators and, in particular, to a generator employing DC charging. Described in copending application Ser. No. 770,292, filed Oct. 24, 1968, assigned to the assignee of the present application, is a high-power, solid-state pulse-generating system employing an alternating current storage device operative to store RF energy. The storage device is connected to a load, such as an RF antenna, through a variable mutual coupling network. A control circuit, also connected to the variable mutual coupling network, supplies a time-varying control signal. In response to the control signal, the mutual coupling between the storage device and the antenna is varied to allow the energy stored in the storage device to be unilaterally transferred to the antenna.

This invention relates to an apparatus useful, for example, in supplying energy to the RF storage device described above. To achieve efficiency, present RF generators employ RF charging from a solid-state RF generator connected to an extremely high resonance Q storage tank. This high Q is obtained by use of heavy low-loss cables and bulky component construction. Furthermore, in the RF-charging apparatus, the oscillations supplied to the tank circuit during the interpulse period may leak into the antenna circuit causing unwanted radiation. To cancel the leakage power, additional equipment must be employed.

SUMMARY OF THE INVENTION

A circuit according to the present invention for generating RF energy includes a source of DC energy having a first predetermined voltage level and connected through a charging switch means to a charging means. Connected to the charging means is an RF tank circuit including a storage means, and a load. A power switch is connected in parallel with the series-connected tank circuit and the load.

During a first predetermined time, the charging switch means connects the DC energy source to the RF tank circuit. The storage element, for example, a capacitor, cooperates with the charging means to form a resonant charging circuit and to thereby raise the voltage level at the charging capacitor to substantially twice the voltage level of the energy source. The charging switch is then opened and a power switch, connected to the RF tank circuit and the load, is closed for a second predetermined time allowing the RF tank circuit to oscillate at its resonant frequency through the load to thereby generate a high-power RF signal directly from a DC energy source.

BRIEF DESCRIPTION OF THE DRAWINGS

The construction and operation of the apparatus according to the invention will be more fully understood from the following detailed description taken in conjunction with the accompanying drawings in which.

DETAILED DESCRIPTION OF THE INVENTION

Figure 1:
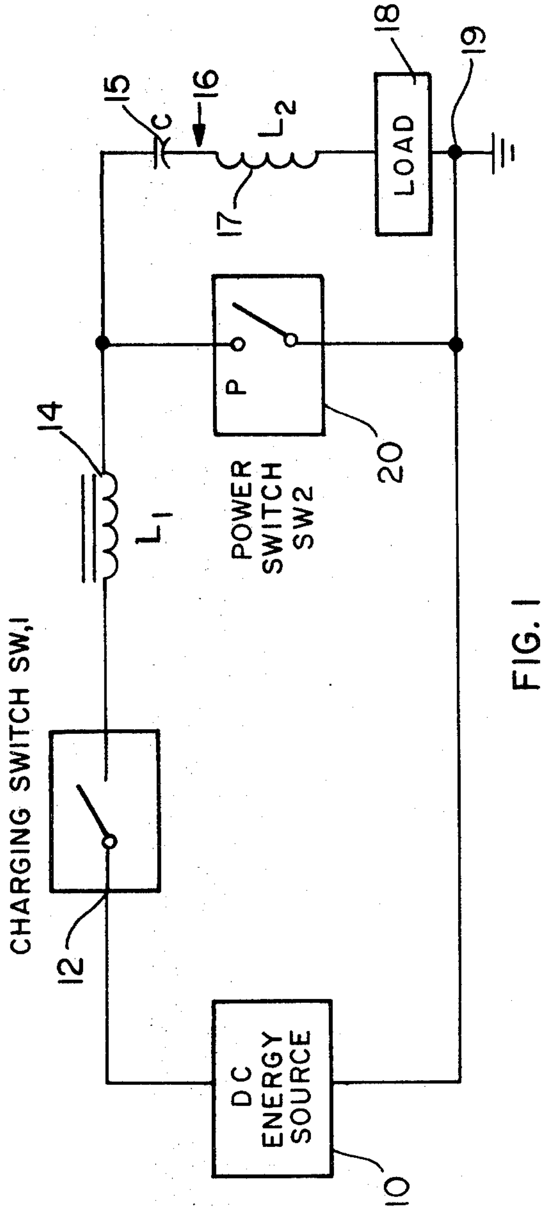
FIG. 1 is a simplified schematic diagram of an RF generator according to the present invention.

A circuit for generating an RF signal according to the present invention is illustrated in the simplified schematic diagram of FIG. 1. The circuit includes a DC energy source 10 of voltage level E, for example, a DC power supply connected through a charging switch 12 to one end of a charging means such as a charging inductor 14. The other end of the charging inductor 14 is connected to a tank circuit 16 including a capacitor 15 and a second inductor 17. Connected to the tank circuit 16 is a load 18, for example, the combination of the mutual coupling circuit and antenna circuit described in the aforementioned copending application. A power switch 20 is connected in parallel with the tank circuit 16 and the load 18. The common connection of the power switch 20 and the load 18 and the DC energy source 10 are connected to a source of reference potential such as ground 19.

Figure 2:
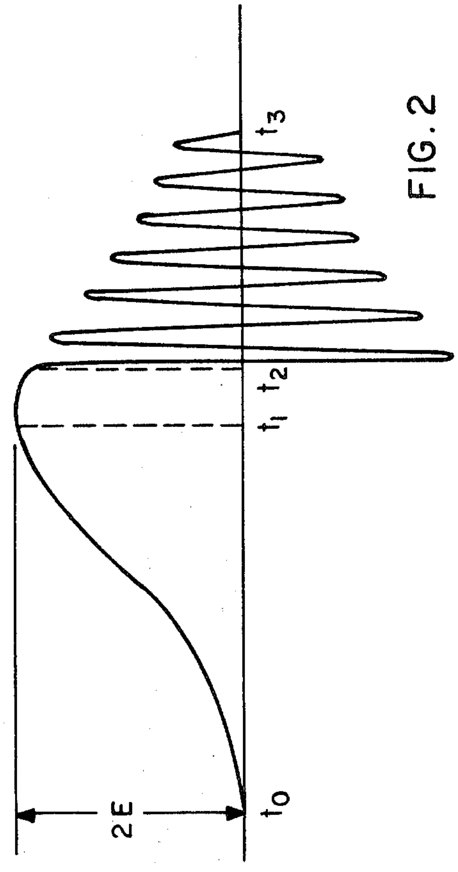
FIG. 2 is a waveform useful in explaining the operation of the embodiment of FIG. 1.

The waveform of FIG. 2 is useful in explaining the operation of the embodiment of FIG. 1. Assuming the power switch 20 is in the open position, the charging of the tank circuit capacitor 15 is accomplished by closing the charging switch 12 at a first predetermined time $t_o$. The switch closure connects the DC energy source 10 to the capacitor 15 of the tank circuit 16 via the charging inductor 14. The resonance circuit formed by the charging inductor 14 and the tank capacitor 15 causes the voltage across the capacitor 15 to rise to substantially twice the value E of the DC energy source 10. At a second predetermined time $t_1$ (when the capacitor 15 reaches the peak charging voltage), the charging switch 12 is opened to prevent the capacitor 15 from discharging back through the DC energy source 10. At a third predetermined time $t_2$, the power switch 20 is closed allowing the tank circuit 16 to oscillate at its natural frequency whereby an RF signal is delivered to the load 18.

Figure 3:
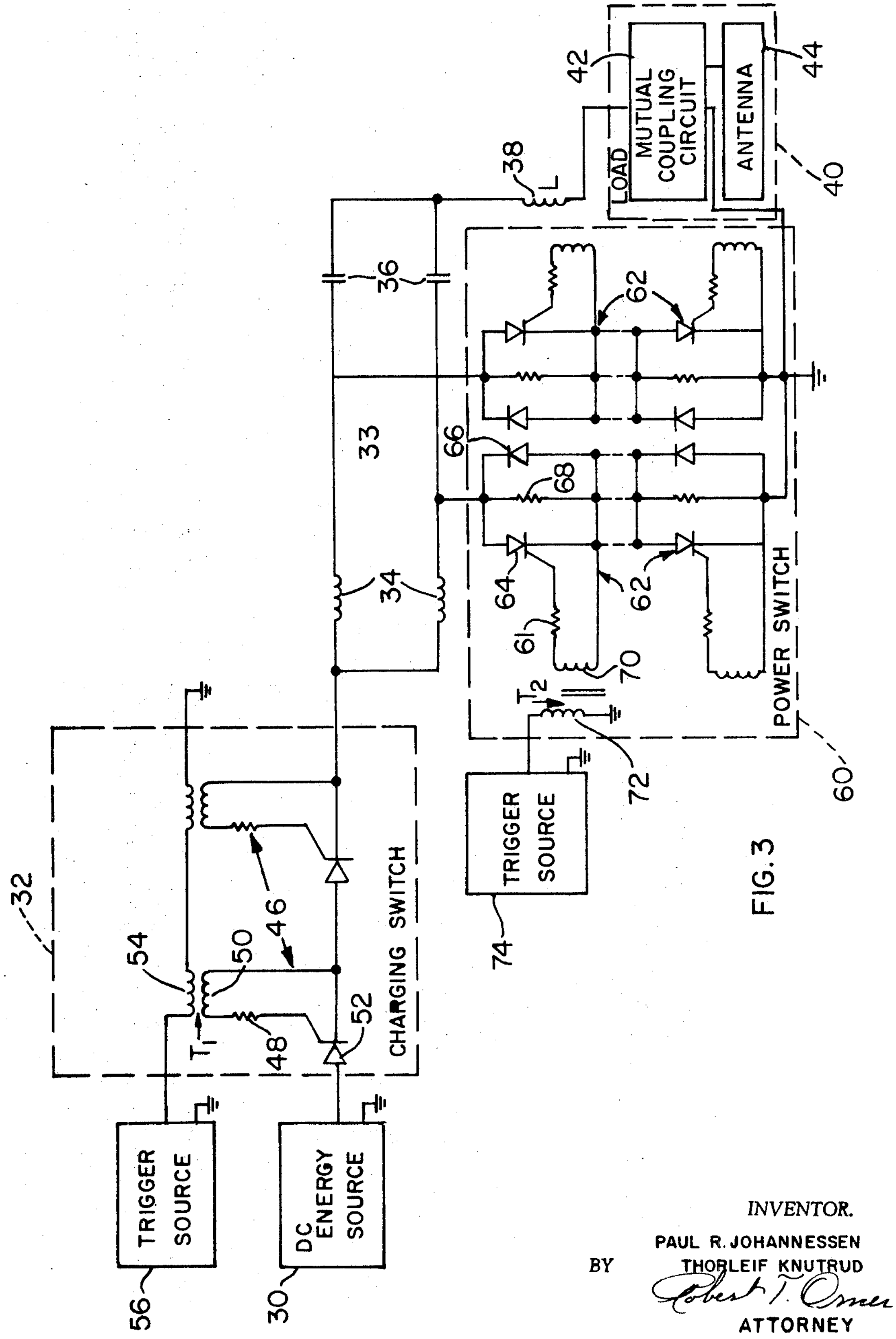
FIG. 3 is a detailed schematic diagram of the embodiment of FIG. 1.

A more detailed schematic diagram of an embodiment of a high-power RF generator according to the present invention is shown in FIG. 3 and includes a DC energy source 30 coupled through a charging switch 32 to one end of a plurality of parallel-connected branches, two of which are shown, each branch 33 including a series connected charging inductor 34 and a capacitor 36. Connected in series with the plurality of parallel-connected branches 33 is a tank inductor 38. The combination of the tank inductor 38 and the branch capacitors 36 create a resonant tank circuit. A load 40, for example, the combination of a variable mutual coupling circuit 42 and an antenna circuit 44 described in detail in the aforementioned copending application, is connected between the inductor 38 and ground. A power switch 60 is connected across the tank circuit and the load 40.

The charging switch 32 includes a plurality of series-connected controlled rectifier circuits 46, for example, silicon-controlled rectifiers (SCR). Each controlled rectifier circuit 46 includes a series combination of a current-limiting resistor 48 and the secondary winding 50 of a first transformer $T_1$ connected between the cathode and gate electrodes of an SCR 52. The primary winding 54 of the first transformer $T_1$ is connected to any well-known trigger signal source 56 and ground.

A power switch 60 includes a plurality of rows of bipolar switches 62, two of which are shown, each row being connected to a different one of the plurality of parallel-connected branches 33. Each bipolar switch 62 includes a controlled rectifier 64 connected in parallel with a diode 66 and a bleeder resistor 68. The anode and cathode of the controlled rectifier are connected to the cathode and anode, respectively, of the diode 66 in an opposite polarity configuration to thereby form a bipolar switch. Connected between the gate electrode and the cathode of each controlled rectifier 64 are a current limiting resistor 61 and the secondary winding 70 of a second transformer $T_2$. The primary winding 72 of the second transformer $T_2$ is connected to a second trigger source 74.

The operation of the RF generator of FIG. 3 is initiated by the application of a trigger pulse to the primary winding 54 of the first transformer $T_1$ from the first trigger source 56. This trigger pulse is coupled to the gate electrodes of the series-connected controlled rectifiers 46 via the secondary windings 50 of the first transformer $T_1$. The charging switch 32 is thereby closed allowing DC energy to flow from the DC energy source 30 through the charging inductors 34 to the storage capacitors 36. When the charge on the storage capacitors 36 has reached a peak value 2E, the charging current attempts to reverse through the charging switch 32. This reverse current will reverse bias the series-connected controlled rectifiers 46. The reverse bias effectively opens the connection to the DC energy source 30 and leaves the capacitors 36 charged.

At a predetermined time later, the power switch 60 is closed by the application of a trigger pulse from the second trigger source 74 to the gate electrodes of the controlled rectifiers of the bipolar switches 62 via the second transformer $T_2$. The storage capacitors discharge alternately through the triggered controlled rectifiers 64 in the first half-cycle and through the diodes 66 in the next half-cycle. The frequency of the signal at the load 40 is determined by inductance value of the tank inductor 38 and the cumulative value of the capacitors 36.

If the operating frequency is low, for example, less than 50 kHz., the controlled rectifiers of the power switch 60 may require trigger pulses at the beginning of each RF cycle. At the higher frequencies, the power switch 50 will remain closed until the RF oscillations have decayed below the threshold level of controlled rectifiers 64.

To minimize the losses during the energy transfer to the load 40, the conductor loss (or equivalent resistance $R_s$) of the power switch should be as low as possible. As the losses in the inductor 38 and capacitors 36 are low, the Q of the tank circuit will be determined primarily by the equivalent resistance $R_s$ of the power switch 60. The Q of the tank circuit is defined by equation (1)

$$Q=\frac{\omega L}{R_s} \quad (1)$$

where $\omega$ is the angular frequency, L is the value of the inductor 38 and $R_s$ is equivalent resistance. The peak voltage of the RF oscillations relate to the peak current as follows:

$$V_p=\omega L I_p \quad (2)$$

Solving equation (2) for L and substituting the result into equation (1) yields $$Q=\frac{V_p}{I_p R_s} \quad (3)$$

The forward resistance of semiconductor devices decreases with peak rated current but is relatively independent of $V_p$. Therefore, the Q will increase with rated operating voltage. For example, for a 1,000 volt and 400 amp unit, which is representative of the present state of the art, the equivalent resistance $R_s$=0.025 ohms giving a Q=100. This value of Q during power transfer to the load 40 yields a significantly higher efficiency than that allowable with RF charging.

While there has been shown and described what is considered a preferred embodiment of the present invention, it would be obvious to those skilled in the art that various changes may be made therein without departing from the invention.

I claim:

1. A radiofrequency generator comprising:
- a source of direct current energy producing a first predetermined voltage level;
- charging means;
- charging switch means connected between said source of direct current energy and said charging means and being operable to couple said source of direct current energy to said charging means during a first predetermined time;
- a load;
- a radiofrequency tank circuit connected between said charging means and said source of direct current energy and connected in series with said load, said radiofrequency tank circuit including a storage means cooperating with said charging means to develop a second predetermined voltage level of greater magnitude than the first predetermined voltage level of said source of direct current energy; and
- power switch means connected in parallel with the series-connected radiofrequency tank circuit and load and being operative during a second predetermined time to discharge said storage means through said load.

2. A radiofrequency generator according to claim 1 wherein:
- said charging means includes a charging inductor; and
- said charging switch means includes
  - a first transformer having primary and secondary windings and being operative to couple a trigger signal from said primary winding to said secondary winding; and
  - a controlled rectifier having its gate electrode connected to the secondary winding of said first transformer and having its anode and cathode connected between said source of direct current energy and said charging means, said controlled rectifier being operative in response to a trigger signal at its gate electrode to provide a low impedance path between said direct current energy source and said charging means.

3. A radiofrequency generator according to claim 1 wherein:
- said charging means includes a plurality of inductors having one end of each connected together at a common connection; and
- said radiofrequency tank circuit includes
  - an inductance element of predetermined value; and
  - a plurality of capacitors of predetermined value, each having one end connected to the other end of a separate one of the inductors of said charging means to thereby form a plurality of resonant charging circuits with said charging means, and the other end connected to said inductive element to thereby form a radiofrequency tank circuit therewith.

4. A radiofrequency generator according to claim 3 wherein said power switch means includes:
- a second transformer adapted to couple a trigger pulse received across its primary winding to its secondary winding; and
- a plurality of rows of bipolar switches, each row connected between the common connection of the inductors of said charging means and the capacitors of said radiofrequency tank circuit and said load, each of said bipolar switches comprising
  - a diode; and
  - a controlled rectifier having its gate electrode connected to the secondary winding of said second transformer and having its anode and cathode connected in an opposite polarity arrangement with said diode, said controlled rectifier being operative in response to a signal at its gate electrode to substantially reduce the impedance between its anode and cathode electrodes whereby said tank circuit oscillates causing current to flow through said controlled rectifier during one half-cycle and through said diode during the alternate half-cycle.

5. A radiofrequency generator according to claim 4 wherein said charging switch means includes:
- a first transformer having primary and secondary windings and being operative to couple a trigger signal from said primary winding to said secondary winding; and
- a controlled rectifier having its gate electrode connected to the secondary winding of said first transformer and having its anode and cathode connected between said source of direct current energy and said charging means, said controlled rectifier being operative in response to a trigger signal at its gate electrode to provide a low impedance path between said direct current energy source and said charging means.